United States Patent
Bellows et al.

(10) Patent No.: US 7,490,204 B2
(45) Date of Patent: Feb. 10, 2009

(54) USING CONSTRAINTS TO SIMPLIFY A MEMORY CONTROLLER

(75) Inventors: Mark David Bellows, Rochester, MN (US); Ryan Abel Heckendorf, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 11/101,614

(22) Filed: Apr. 7, 2005

(65) Prior Publication Data

US 2006/0230200 A1 Oct. 12, 2006

(51) Int. Cl.
*G06F 13/00* (2006.01)
*G06F 12/00* (2006.01)

(52) U.S. Cl. .................... 711/154; 710/62; 711/170
(58) Field of Classification Search .............. None
See application file for complete search history.

(56) References Cited

U.S. PATENT DOCUMENTS 6,343,292 B1 * 1/2002 Roach et al. ............... 707/101
6,370,067 B1 * 4/2002 Ko et al. .................... 365/194
2004/0098549 A1 5/2004 Dorst ......................... 711/167

FOREIGN PATENT DOCUMENTS

WO WO 00/29921 A3 5/2000

* cited by examiner

*Primary Examiner*—Reginald G Bragdon
*Assistant Examiner*—Eric Loonan
(74) *Attorney, Agent, or Firm*—Van Leeuwen & Van Leeuwen; Matthew B. Talpis

(57) ABSTRACT

A memory controller design tool retrieves parameter ranges supported by a memory controller, and identifies troublesome parameter value combinations. The memory controller design tool suggests to 1) add logic to the memory controller to resolve the conflict, 2) incorporate a constraint that reduces/eliminates command collisions, data conflicts, and/or the need to check particular timing parameters, or 3) a combination of both. The memory controller design tool may work in conjunction with a memory controller designer to define and use the constraints.

4 Claims, 8 Drawing Sheets

| SYMBOL | DESCRIPTION |
| --- | --- |
| $t_{\Delta RW}$ | Read-to-Write Interval |
| $t_{\Delta WR}$ | Write-to-Read Interval (same bank set) |
| $t_{\Delta WR-D}$ | Write-to-Read Interval (different bank set) |
| $t_{CC}$ | Column-to-Column Interval |
| $t_{ERD}$ | Expected Data-to-Read Data Interval |
| $t_{PP}$ | Precharge-to-Precharge Interval |
| $t_{QRD}$ | Read Command-to-Read Data Interval |
| $t_{QTD}$ | Write Command-to-Write Data Interval |
| $t_{RCD-R}$ | Row-to-Column Interval for Reads |
| $t_{RCD-W}$ | Row-to-Column Interval for Writes |
| $t_{RDP}$ | Read-to-Precharge Interval |
| $t_{RR}$ | Row-to-Row Interval (same bank set) |
| $t_{WRP}$ | Write-to-Precharge Interval |

*Figure 4*

| # | GOAL | CONSTRAINT | ACTION/COMMENT |
|---|---|---|---|
| 1 | Efficient Tiling of ROW and COL Packets | $t_{RCD-R}$ = odd<br>$t_{RCD-W}$ = odd | Program an odd number of cycles in the memory controller which is $\geq$ to the min. value specified in the DRAM datasheet. |
| 2 | | $t_{RR} = t_{PP} = 4 * n$<br>(n=1,2,3,...) | Minimum value fixed at four for particular architecture. Memory controller may use a greater value. |
| 3 | Efficient Tiling During Early Read W-R Turnaround | $t_{RCD-W} = t_{RCD-R}$ | |
| 4 | | $t_{\Delta WR-D} = t_{CC}$ or $(t_{CC}+4)$ | |
| 5 | Avoid Collision Between ROWA (wr) and COL-RD on a R-W Turnaround | $t_{\Delta RW} > t_{RCD-W}$ | Either increase $t_{\Delta RW}$ to meet constraint or dynamically adjust $t_{RCD-W}$ for the first write command to meet constraint. |
| 6 | Avoid Collision Between ROWA(rd) and COL-WR or COLM-WR on a W-R Turnaround (non-Early-Read) | $t_{\Delta WR} > t_{RCD-R}$ | Increase $t_{\Delta WR}$ to meet constraint. |
| 7 | Guarantee that $t_{pp}$ is met on a R-W Turnaround | $t_{\Delta RW} \geq t_{RDP} - t_{WRP} + t_{PP} + t_{CC} - 4$ | Increase $t_{\Delta RW}$ to meet constraint. |
| 8 | Guarantee that $t_{pp}$ is met on a W-R turnaround (non-Early-Read) | $t_{\Delta WR} \geq t_{WRP} - t_{RDP} + t_{PP} + t_{CC} - 4$ | Increase $t_{\Delta WR}$ to meet constraint. |
| 9 | Avoid TDATA Conflict on W-R Turnaround When Checking RDATA | $t_{\Delta WR} \geq t_{QTD} + t_{CC} - t_{QRD} + t_{ERD}$ | Increase $t_{\Delta WR}$ to meet constraint. |

*Figure 5*

USING CONSTRAINTS TO SIMPLIFY A MEMORY CONTROLLER

BACKGROUND OF THE INVENTION

1. Technical Field

The present invention relates in general to a method and system for using constraints to simplify a memory controller. More particularly, the present invention relates to a method and system for simplifying a memory controller design by following constraints that reduce/eliminate command collisions, data conflicts, and/or the need to check particular timing parameters in a memory system.

2. Description of the Related Art

Computer system developers constantly strive to increase a computer system's performance. The developers may focus on optimizing software components and/or hardware components in order to achieve this goal. One hardware optimization approach is to improve a processor's rate of reading from memory and writing to memory.

Hardware developers have designed a dynamic random access memory (DRAM) interface that includes a high-speed chip-to-chip data transfer technology. The interface technology may be implemented on standard CMOS DRAM cores and CMOS controller chips for applications such as high-performance main memory, PC graphics, game consoles, advanced digital consumer systems, high-performance networking systems, and other demanding applications requiring high-bandwidth memory subsystems. A memory system that incorporates the newly developed DRAM interface includes a memory controller that issues commands on a command bus to the DRAM through an input/output interface. These commands correspond to read and write operations whereby a typical command sequence for either operation would be an "Activate" command, one or more "Column" commands, and a "Precharge" command. The activate command, also referred to as a row command, opens or senses a row or a page. The column command reads to or writes from a column within a row or page. And finally, the precharge command closes a row or a page.

A memory controller designer factors in many device (i.e. DRAM) timing parameters and their ranges of value when designing a memory controller. Invariably, the memory controller designer identifies many parameter value combinations that would cause command collisions, data conflicts, or the need to check particular timing parameters. For example, the memory controller designer is required to design a memory controller such that the memory controller issues commands that correspond to a read operation far enough away from commands that correspond to a write operation, and in such a way that the commands do not collide despite the fact that there is usually some operation duration overlap.

A challenge found with designing a memory controller is resolving troublesome parameter value combinations without overly designing the memory controller. The memory controller may become very complicated, and potentially not function correctly and/or miss schedule milestones, if it includes mechanisms to handle each and every such parameter value combination.

What is needed, therefore, is a method and system to simplify a memory controller design, while maximizing memory controller performance and maintaining support for wide ranges of parameter values.

SUMMARY

It has been discovered that the aforementioned challenges are resolved using a method and system to define constraints and use the constraints to simplify the design of the memory controller. A memory controller design tool identifies a troublesome parameter value combination, and 1) informs a memory controller designer to add logic to the memory controller to handle the troublesome parameter value combination, 2) incorporates a constraint that reduces/eliminates command collisions, data conflicts, and/or the need to check particular timing parameters, or 3) a combination of "1" and "2" in order to resolve the troublesome parameter value combination. The memory controller design tool may work in conjunction with a memory controller designer to define and use the constraints.

A memory controller design tool retrieves timing parameter ranges and determines whether designing a memory controller that meets the full architectural range of each timing parameter (a common goal) is too complicated. The memory controller is required to meet each timing parameter, but not necessarily the full architectural range of each timing parameter, and not necessarily the optimal (usually minimum) value of each timing parameter. The memory controller may be deemed "too complicated" due to design/technical difficulties or other issues, such as being able to complete the memory controller design in a particular amount of time in order to meet schedule requirements.

When the memory controller design tool determines that designing a memory controller that meets the full architectural range of each timing parameter is too complicated, the memory controller design tool selects a particular troublesome parameter value combination. The memory controller design tool determines whether the selected troublesome parameter value combination is likely to occur in real life. In general, the architectural ranges for the timing parameters are broad, and are intended to cover future devices that may or may not come into existence. If the selected troublesome parameter value combination is not likely to occur in real life, or will occur but only with very few devices, the memory controller design tool identifies, defines, and stores a constraint that reduces/eliminates command collisions, data conflicts, and/or the need to check particular timing parameters otherwise resulting from the particular troublesome parameter value combination.

On the other hand, if the selected troublesome parameter value combination is likely to occur and to be abundant in real life, the memory controller design tool determines whether complex memory controller logic is required to handle the troublesome parameter value combination. The "complexity" may depend upon design goals such as area, timing, power, verification effort, schedule, etc. If complex logic is not required in order to handle the troublesome parameter value combination, the memory controller design tool informs the memory controller designer to design memory controller logic that handles the troublesome parameter value combination.

On the other hand, if complex logic is required to handle the troublesome parameter value combination, the memory controller design tool determines whether designing the memory controller logic is significantly simplified by adding a constraint. If not, the memory controller design tool informs the memory controller designer, and potentially other team members, to resolve the troublesome parameter value combination, which may include adding logic, incorporating a constraint, or a combination of both.

If the memory controller design tool determines that the memory controller logic is significantly simplified by adding a constraint, the memory controller design tool determines whether adding a constraint significantly degrades the performance of the memory system, such as significantly slowing memory accesses. If so, the memory controller design tool informs the memory controller designer, and potentially other team members, to decide on how to resolve the troublesome parameter value combination as discussed above.

On the other hand, if adding a constraint does not significantly degrade the performance of the memory system, the memory controller design tool identifies and defines a constraint to handle the troublesome parameter value combination. Once the memory controller design tool addresses each troublesome parameter value combination, the memory controller designer is able to use the defined constraints to select DRAMs and configure the memory system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 4 is a table showing various timing parameters;

FIG. 5 is a table showing various constraints to simplify a memory controller;

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
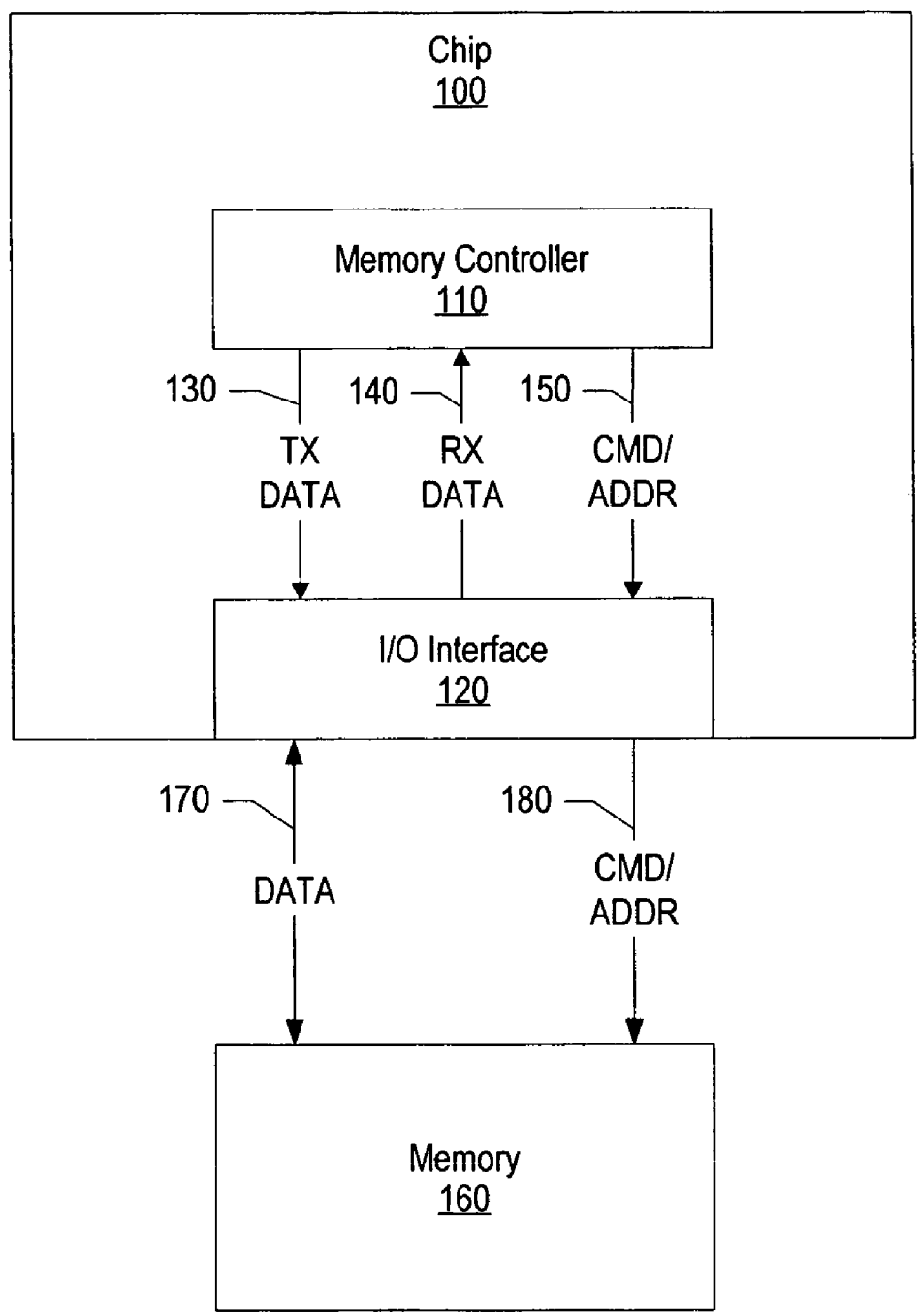
FIG. 1 is a diagram showing a memory system that may use constraints.

FIG. 1 is a diagram showing a memory system that may use constraints. The memory system includes memory controller 110 and input/output interface 120, which are included in chip 100, along with memory 160. Memory controller 110 sends data to and receives data from input/output interface 120 over transmit data bus 130 and receive data bus 140, respectively. In turn, input/output interface 120 sends the data to and receives the data from memory 160 over data bus 170.

Memory controller 110 sends commands and address information to input/output interface over command/address bus 150. In turn, input/output interface 120 sends the commands and address information to memory 160 over command/address bus 180.

The timing of the commands that are sent over command/address bus 150 and 180 must adhere to timing parameters of both input/output interface 120 and memory 160 (i.e. DRAMs). When designing memory controller 110, a memory controller designer analyzes these timing parameters and, invariably, the memory controller designer identifies many parameter value combinations that would cause command collisions, data conflicts, or the need to check particular timing parameters. For example, the memory controller designer is required to design a memory controller such that the memory controller issues commands that correspond to a read operation far enough away from commands that correspond to a write operation, and in such a way that the commands do not collide despite the fact that there is usually some overlap of the operation durations.

A memory controller may become very complicated and potentially miss area goals, timing goals, and/or schedule milestones if the memory controller designer designs in mechanisms to handle each troublesome parameter value combination. This invention provides a method for the memory controller designer to 1) add logic to the memory controller to resolve the conflict, 2) incorporate a constraint, or 3) a combination of "1" and "2" in order to resolve a troublesome parameter value combination. The constraint corresponds to a constraint type that may reduce/eliminate command collisions, data conflicts, and/or the need to check particular timing parameters (see FIGS. 3 through 8, and corresponding text, for further details regarding troublesome parameter value combination resolution)

Figure 2:
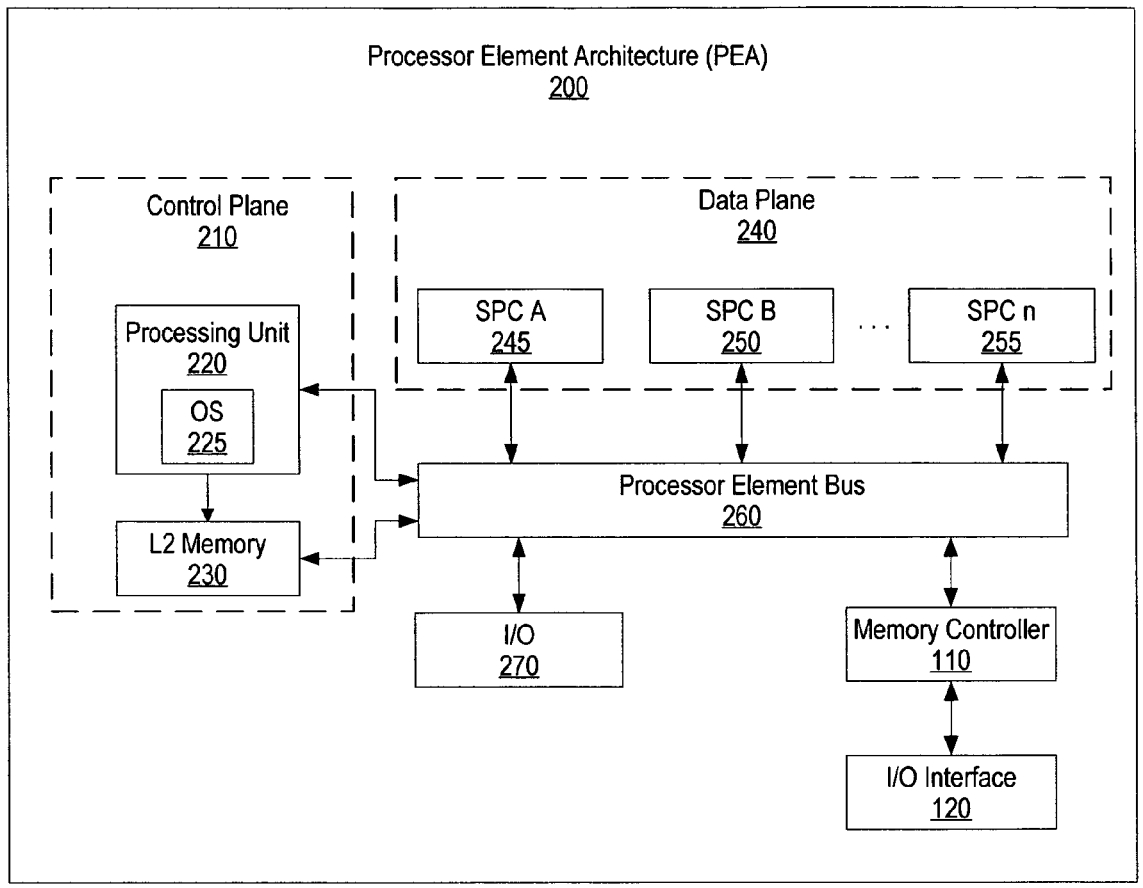
FIG. 2 is a block diagram showing a processor element architecture capable of implementing the present invention.

FIG. 2 is a block diagram showing a processor element architecture capable of implementing the present invention. The architecture shown in FIG. 2 includes heterogeneous processors that share a common memory and a common bus. Processor element architecture (PEA) 200 sends and receives information to/from external devices through input output 270, and distributes the information to control plane 210 and data plane 240 using processor element bus 260. Control plane 210 manages PEA 200 and distributes work to data plane 240.

In addition, processor element bus 260 provides read and write requests to memory controller 110. Memory controller 110 communicates the requests to input/output interface 120 that, in turn, communicates with external memory. Memory controller 110 and input/output interface 120 are the same as that shown in FIG. 1. In one embodiment, the memory may be Extreme Data Rate (XDR™) DRAM, and, in this embodiment, memory interface 120 is an XIO™ interface that communicates with the XDR™ DRAM.

Control plane 210 includes processing unit 220, which runs operating system (OS) 225. For example, processing unit 220 may be a Power PC core that is embedded in PEA 200 and OS 225 may be a Linux operating system. Processing unit 220 manages a common memory map table for PEA 200. The memory map table corresponds to memory locations included in PEA 200, such as L2 memory 230 as well as non-private memory included in data plane 240.

Data plane 240 includes Synergistic Processing Complexes (SPC) 245, 250, and 255. Each SPC is used to process data information and each SPC may have different instruction sets. For example, PEA 200 may be used in a wireless communications system and each SPC may be responsible for separate processing tasks, such as modulation, chip rate processing, encoding, and network interfacing. In another example, each SPC may have identical instruction sets and may be used in parallel to perform operations benefiting from parallel processes. Each SPC includes a synergistic processing unit (SPU), which is a processing core, such as a digital signal processor, a microcontroller, a microprocessor, or a combination of these cores.

SPC 245, 250, and 255 are connected to processor element bus 260, which passes information between control plane 210, data plane 240, and input/output 270. Bus 260 is an on-chip coherent multi-processor bus. Input/output 270 includes flexible input-output logic, which dynamically assigns interface pins to input-output controllers based upon peripheral devices that are connected to PEA 200. For example, PEA 200 may be connected to two peripheral devices, such as peripheral A and peripheral B, whereby each peripheral connects to a particular number of input and output pins on PEA 200. In this example, the flexible input-output logic is configured to route PEA 200's external input and output pins that are connected to peripheral A to a first input-output controller and route PEA 200's external input and output pins that are connected to peripheral B to a second input-output controller.

While the computer system described in FIG. 2 is capable of executing the processes described herein, this computer system is simply one example of a computer system. Those skilled in the art will appreciate that many other computer system designs are capable of performing the processes described herein.

Figure 3:
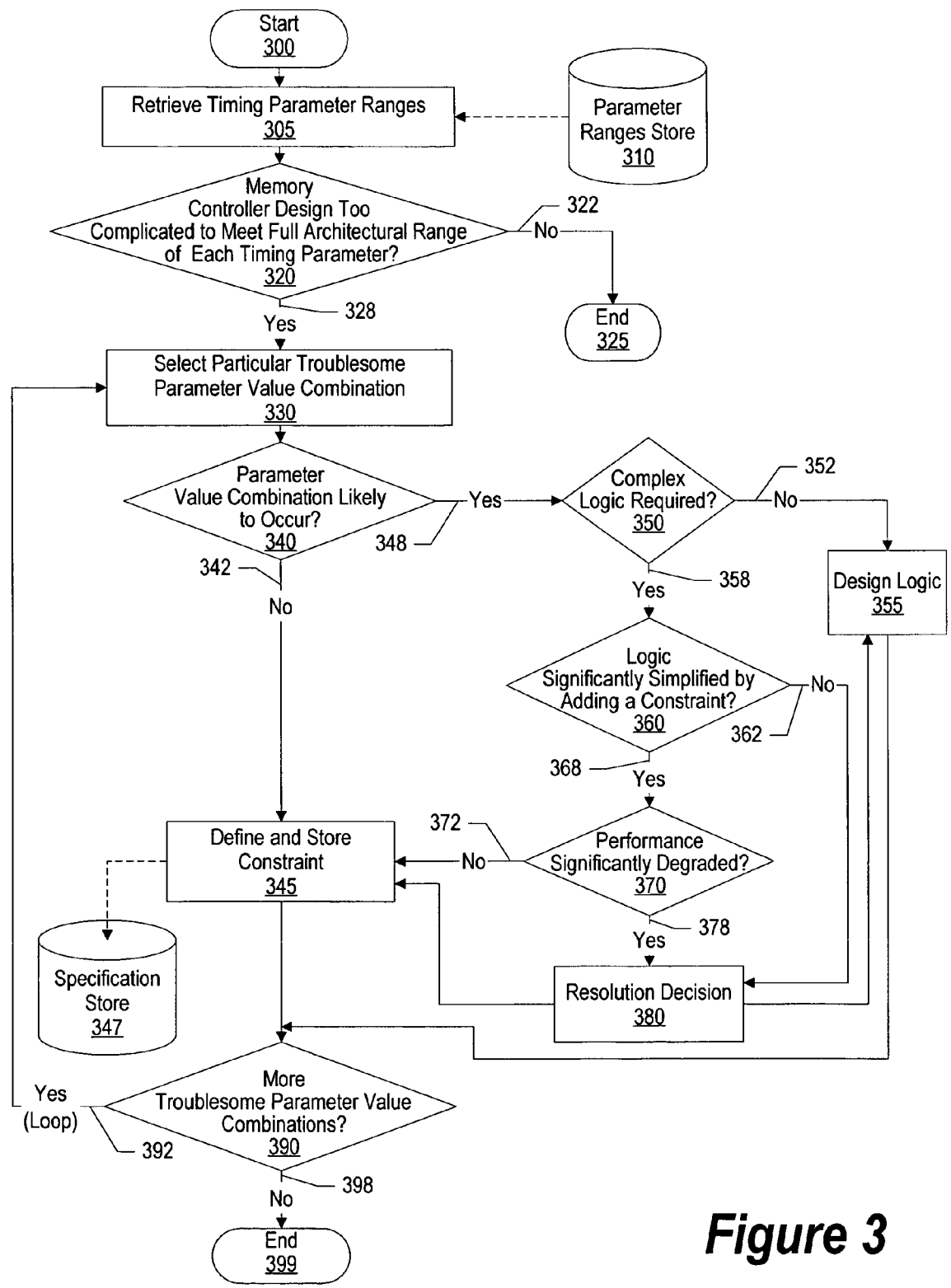
FIG. 3 is a flowchart showing steps taken in resolving troublesome parameter value combinations.

FIG. 3 is a flowchart showing steps taken in resolving troublesome parameter value combinations. A memory controller designer is faced with designing a memory controller to meet many different timing parameters. Each of the timing parameters, most likely, has a range in which the parameter value may fall. For example, a timing parameter may have a range from 2 nanoseconds to 10 nanoseconds. In addition, the memory controller designer must also consider the interrelation of the timing parameters, or "parameter value combinations," when designing the memory controller. When particular troublesome parameter value combinations cause issues such as command collisions, data conflicts, and/or the need to check particular timing parameters, the memory controller designer uses a memory controller design tool to choose a particular approach to resolve the issues.

Processing commences at 300, whereupon processing retrieves timing parameter ranges from parameter ranges store 310 at step 305. The timing parameter ranges correspond to the memory system architecture that is selected. A determination is made as to whether designing a memory controller to meet the full architectural range of each timing parameter is too complicated (decision 320). To clarify, the memory controller is required to meet each timing parameter, but not necessarily the full architectural range of each timing parameter, and not necessarily the optimal (usually minimum) value of each timing parameter. The memory controller may be deemed "too complicated" due to design/technical difficulties or other issues, such as being able to complete the memory controller design in a particular amount of time in order to meet schedule requirements.

If the memory controller design is not too complicated to meet the full architectural range of each timing parameter, decision 320 branches to "No" branch 322 whereupon processing ends, and the memory controller designer designs the memory controller based upon the full architectural range of each of the timing parameters.

On the other hand, if designing the memory controller is too complicated to meet the full architectural range of each timing parameter, decision 320 branches to "Yes" branch 328 whereupon processing selects a particular troublesome parameter value combination (step 330). A determination is made as to whether the selected troublesome parameter value combination is likely to occur in real life (e.g. occurrence probability) (decision 340). In general, the architectural ranges for the timing parameters are broad, and are intended to cover future devices that may or may not come into existence. If the selected timing parameter value combination is not likely to occur in real life, or will occur but only with very few devices, decision 340 branches to "No" branch 342 whereupon processing identifies, defines, and stores a constraint that reduces/eliminates command collisions, data conflicts, and/or the need to check particular timing parameters otherwise resulting from the particular troublesome parameter value combination (step 345). This constraint is then used when the memory controller designer selects DRAMs and configures the memory system (see FIG. 8 and corresponding text for further details regarding DRAM selection and memory system configuration).

On the other hand, if the particular troublesome parameter value combination is likely to occur and to be abundant in real life, decision 340 branches to "Yes" branch 348 whereupon a determination is made as to whether complex memory controller logic is required in order to handle the troublesome parameter value combination (decision 350). For example, the "complexity" may depend upon design goals such as area, timing, power, verification effort, schedule, etc. If complex logic is not required in order to handle the timing parameter value combination, decision 350 branches to "No" branch 352 whereupon the memory controller designer designs memory controller logic that handles the troublesome parameter value combination (step 355). On the other hand, if complex logic is required in order to handle the timing parameter value combination, decision 350 branches to "Yes" branch 358.

A determination is made as to whether the design of the memory controller logic is significantly simplified by adding a constraint (decision 360). If the memory controller logic design is not significantly simplified by adding a constraint, decision 360 branches to "No" branch 362 whereupon the memory controller designer, and potentially other team members, decide on how to resolve the troublesome parameter value combination (step 380). The resolution may be to 1) add logic to the memory controller to resolve the conflict (step 355), 2) incorporate a constraint that reduces/eliminates command collisions, data conflicts, and/or the need to check particular timing parameters (step 345), or 3) a combination of steps 345 and 355.

On the other hand, if the memory controller logic is significantly simplified by adding a constraint, decision 360 branches to "Yes" branch 368. For example, a schedule conflict may exist, and adding a constraint simplifies the logic design such that the time it takes to design the logic is cut in half. A determination is made as to whether adding a constraint significantly (i.e. unacceptably) degrades the performance of the memory system (decision 370). If adding a constraint significantly degrades the performance of the memory system, decision 370 branches to "Yes" branch 378, whereupon the memory controller designer, and potentially other team members, decide on how to resolve the troublesome parameter value combination as discussed above.

On the other hand, if adding a constraint does not significantly degrade the performance of the memory system, decision 370 branches to "No" branch 372 whereupon processing identifies, defines, and stores a constraint in specification store 347 that handles the particular troublesome parameter value combination. Specification store 347 may be stored in a nonvolatile storage area, such as a computer hard drive.

A determination is made as to whether there are more troublesome parameter value combinations to resolve (decision 390). If there are more parameter combination conflict to resolve, decision 390 branches to "Yes" branch 392 which loops back to select the next troublesome parameter value combination. This looping continues until there are no more troublesome parameter value combinations to resolve, at which point decision 390 branches to "No" branch 398 whereupon processing ends at 399.

FIG. 4 is a table showing various timing parameters that correspond to communication between a memory controller, an input/output interface, and memory. Table 400 includes various timing parameters that correspond to one or more constraints that are shown in FIG. 5. The timing parameters that are listed in FIG. 4 are associated with an extreme data rate (XDR™) memory system. As one skilled in the art can appreciate, this invention also applies to other memory systems, which may result in constraints that include timing parameters other than, or slightly different from, those that are shown in FIG. 4.

Table 400 includes columns 410 and 420. Column 410 includes a list of parameter symbols, whereby each of the parameter symbols are included in one or more of the constraint examples that are shown in FIG. 5. Column 420 includes a list of parameter descriptions that correspond to the parameter symbols shown in column 410. For example, row 430 includes the parameter symbol "$t_{\Delta RW}$," which is a read-to-write interval. The examples shown in FIG. 5 show that $t_{\Delta RW}$ is included in constraints five (row 570) and seven (row 580) (see FIG. 5 and corresponding text for further details regarding constraints).

FIG. 5 is a table showing various constraints to simplify a memory controller. The constraint examples that are shown in FIG. 5 are associated with an extreme data rate (XDR™) memory system. As one skilled in the art can appreciate, this invention also applies to other memory systems, which may result in constraints other than those that are shown in FIG. 5.

Table 500 includes columns 510 through 540. Column 510 includes a list of constraint numbers, which is used in this application for referencing purposes. Column 520 includes a list of goals that correspond to the constraints, which are shown in column 530. Column 540 includes a list of actions/comments that correspond to the constraints that are included in column 530. The constraints shown in column 530 include parameter symbols, whereby a description of each of the parameter symbols is shown in FIG. 4.

Table 500 includes rows 550 through 590. Rows 550 and 555 include constraints whose goal is efficient tiling of row and column packets. Row 550 includes the constraint "$t_{RCD-R}$=odd" and "$t_{RCD-W}$=odd," which means that the row-to-column interval for reads and the row-to-column interval for writes are on odd numbers of command cycles. Row 555 includes the constraint "$t_{RR}=t_{PP}=4*n$," which means that the row-to-row interval equals the precharge-to-precharge interval, which equals four times a positive integer value.

Rows 560 and 565 include constraints whose goal is efficient tiling during write-to-read (early read) turnarounds. Row 560 includes the constraint "$t_{RCD-W}=t_{RCD-R}$" which means that the row-to-column interval for reads equals the row-to-column interval for writes. Row 565 includes the constraint "$t_{\Delta WR-D}=t_{CC}$ or ($t_{CC}$+4)," which means that the write-to-read interval to a different bank set equals the column-to-column interval or the column-to-column interval plus four command cycles.

Row 570 includes a constraint whose goal is to avoid collisions between row activate (write) and column read commands on a read-to-write turnaround. Row 570 includes the constraint "$t_{\Delta RW}>t_{RCD-W}$," which means that the read-to-write interval must be greater than the row-to-column interval for writes (see FIG. 6 and corresponding text for a detailed illustration and further description of this constraint, as an example).

Row 575 includes a constraint whose goal is to avoid collisions between row activate (read) and column write or column masked write on a write-to-read (non-Early-Read) turnaround. Row 575 includes constraint "$t_{\Delta WR}>t_{RCD-R}$," which means that the write-to-read interval must be greater than the row-to-column interval for reads. Row 580 includes a constraint whose goal is to guarantee that the precharge-to-precharge interval is met on a read-to-write turnaround. Row 580 includes constraint "$t_{\Delta RW} \geq t_{RDP}-t_{WRP}+t_{PP}+t_{CC}-4$."

Row 585 includes a constraint whose goal is to guarantee that the precharge-to-precharge interval is met on a write-to-read (non-Early-Read) turnaround. Row 585 includes constraint "$t_{\Delta WR} \geq t_{WRP}-t_{RDP}+t_{PP}+t_{CC}-4$" (see FIG. 7 and corresponding text for a detailed illustration and description of this constraint, as an example).

Row 590 includes a constraint whose goal is to avoid a transmit data conflict on a write-to-read turnaround when checking receive data. More specifically, this constraint ensures that the "expects" data does not come earlier than the last part of transmit data during a periodic timing calibration. Row 590 includes constraint "$t_{\Delta WR} \geq t_{QTD}+t_{CC}-t_{QRD}+t_{ERD}$."

As stated above, the constraints in table 500 correspond to an XDR™ memory system and, as one skilled in the art can appreciate, this invention applies to other memory systems, which may result in constraints other than those that are shown in FIG. 5.

Figure 6:
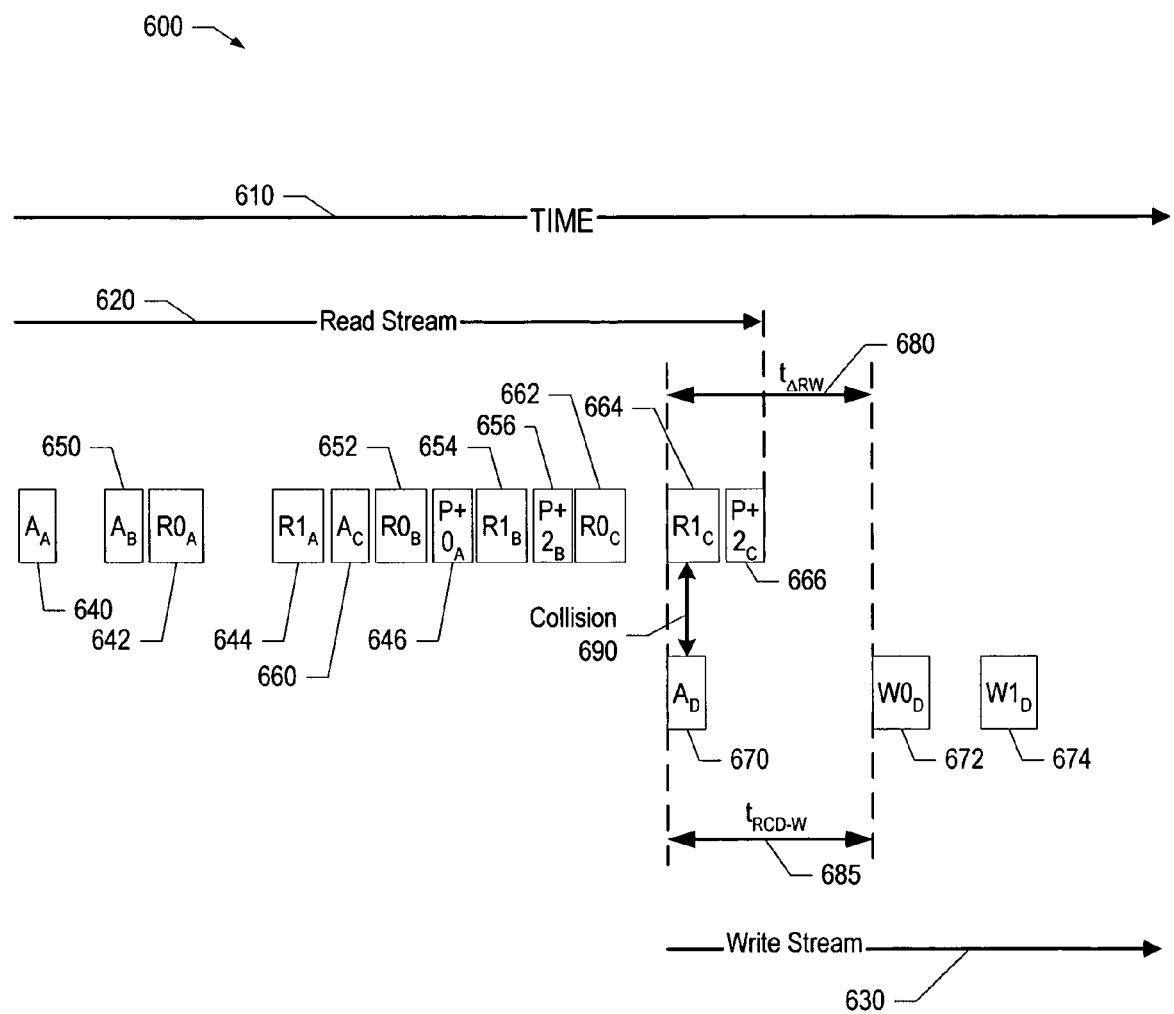
FIG. 6 is a diagram showing how one constraint reduces memory command collisions.

FIG. 6 is a diagram showing how one constraint reduces memory command collisions. Timing diagram 600 shows how constraint five, row 570 shown in FIG. 5, simplifies a memory controller design. Constraint five is "$t_{\Delta RW}>t_{RCD-W}$," and its goal is to avoid collisions between a row activate command for a write operation (ROWA(wr)) and column read commands on a read-to-write turnaround. In other words, constraint five requires that the read-to-write interval ($t_{\Delta RW}$ 680) be greater than the row-to-column interval for writes ($t_{RCD-W}$ 685). FIG. 6 shows the case when $t_{\Delta RW}=t_{RCD-W}$.

Timing diagram 600 includes commands 640 through 674 that correspond to timeline 610. Each of the commands is issued on a command bus, such as command/address buses 150 and 180 that are shown in FIG. 1. Commands 640 through 666 correspond to read operations (e.g. read stream 620) whereas commands 670 through 674 correspond to a write operation (e.g. write stream 630).

Commands 640 through 646 correspond to read operation "A," which targets bank A in the DRAMs. Command 640 is a row activate command, commands 642 and 644 are column read commands, and command 646 is a row precharge command. Likewise, commands 650 through 656 correspond to read operation "B," which targets bank B in the DRAMs. Command 650 is a row activate command, commands 652 and 654 are column read commands, and command 656 is a row precharge command that is issued two command cycles before it is executed in the DRAMs. Furthermore, commands 660 through 666 correspond to read operation "C," which targets bank C in the DRAMs. Command 660 is a row activate command, commands 662 and 664 are column read commands, and command 666 is a row precharge command that is issued two command cycles before it is executed in the DRAMs.

Commands 670 through 674 correspond to write operation "D," which targets bank D in the DRAMs. Command 670 is a row activate command, and commands 672 and 674 are column write commands (write operation "D's" corresponding row precharge command, and other write operations, are not shown in FIG. 6 for the sake of simplicity). As can be seen, when $t_{ARW}$ 680 is not greater than $t_{RCD-W}$ 685, collision 690 may occur between a column read command (command 664) and a row activate command (command 670) on a read-to-write turnaround. When $t_{ARW}$ 680 is increased to a value that is greater than $t_{RCD-W}$ 685, command 670 shifts to the "right," thereby avoiding a collision between it and a column read command. Also, it should be mentioned that row precharge commands are allowed more flexible scheduling, and therefore yield to row activate and column commands. If this constraint were ignored, the memory controller would need special hardware to ensure that such a collision does not occur.

As one skilled in the art can appreciate, the command tiling for the read stream may differ from what is shown in FIG. 6, based on system configuration and dynamic conditions. Likewise for the write stream. Therefore, a collision may also occur prior to 690 without the constraint. FIG. 6 is just one possibility, meant for illustrative purposes only.

Figure 7:
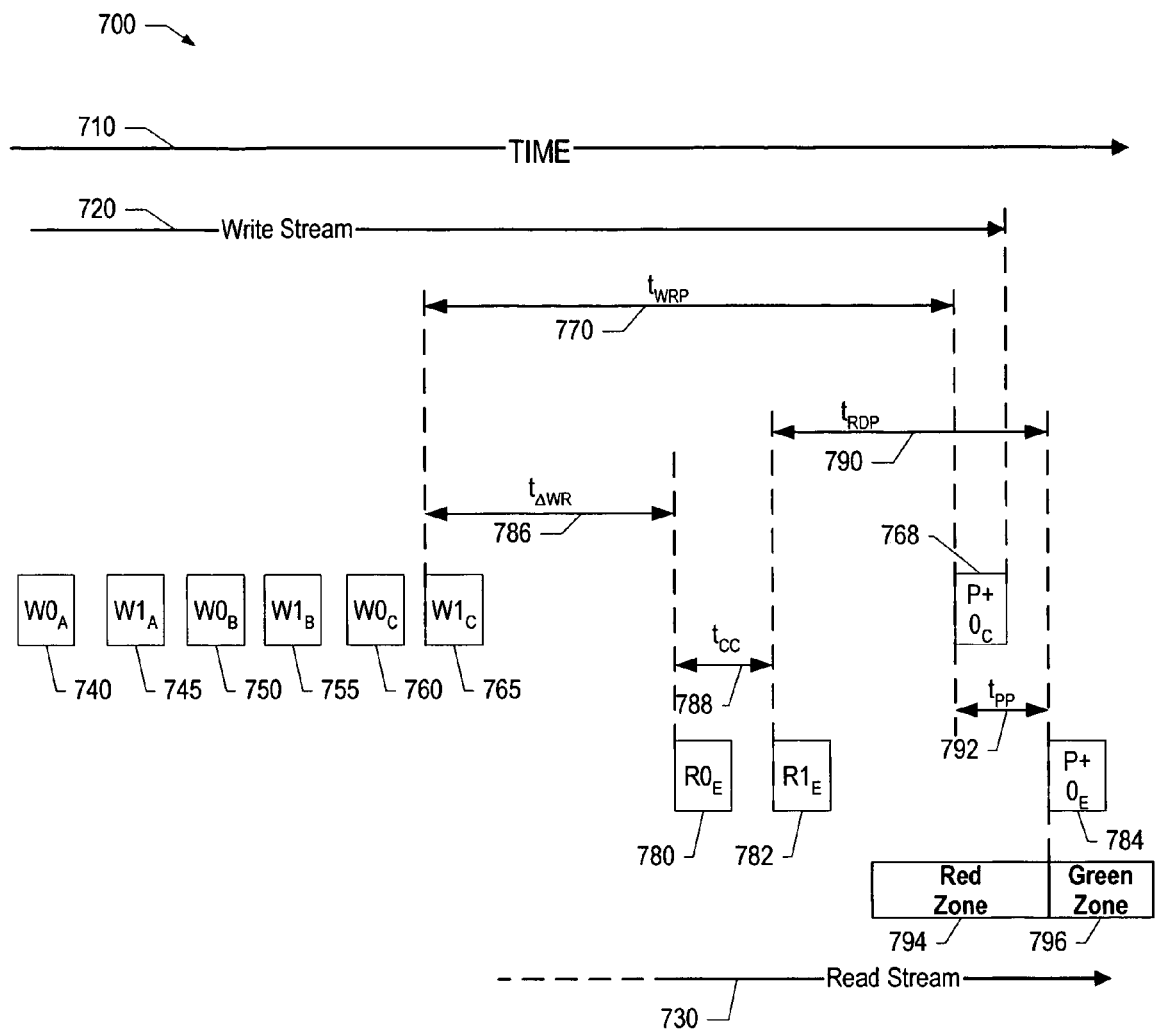
FIG. 7 is a diagram showing how another constraint eliminates the need to check a parameter.

FIG. 7 is a diagram showing how another constraint eliminates the need to check a parameter. Timing diagram 700 shows how constraint eight, row 585 shown in FIG. 5, simplifies a memory controller design. Constraint eight is "$t_{AWR} \geq t_{WRP} - t_{RDP} + t_{PP} + t_{CC} - 4$," and its goal is to guarantee that the precharge-to-precharge interval ($t_{PP}$) is met on a non-Early-Read write-to-read turnaround. In other words, constraint eight requires that the write-to-read interval ($t_{AWR}$ 786) is large enough such that the interval between a write operation's row precharge command (command 768) and a read operation's row precharge command (command 784) meets a device's $t_{PP}$ requirement. Timing parameters $t_{WRP}$ 770, $t_{CC}$ 788, $t_{RDP}$ 790, and $t_{PP}$ 792 factor in to the constraint and are shown in FIG. 7.

Timing diagram 700 includes commands 740 through 784 that correspond to timeline 710. Each of the commands is issued on a command bus, such as command/address buses 150 and 180 that are shown in FIG. 1. Commands 740 through 768 correspond to write operations (e.g. write stream 720) whereas commands 780 through 784 correspond to a read operation (e.g. read stream 730).

Commands 740 and 745 are column write commands that correspond to write operation "A," which targets bank A in the DRAMs. Commands 750 and 755 are column write commands that correspond to write operation "B," which targets bank B in the DRAMs. And, commands 760 and 765 are column write commands that correspond to write operation "C," which targets bank C in the DRAMs. Command 768 is a row precharge command that corresponds to write operation "C." (Row precharge commands associated with write operations "A" and "B," as well as the row activate command for read operation "E," and other read operations, are not shown for the sake of simplicity). Commands 780 through 784 correspond to read operation "E," which targets bank E in the DRAMs. Commands 780 and 782 are column read commands and command 784 is a row precharge command.

As one skilled in the art can appreciate, when $t_{AWR}$ 786 is not large enough, command 784 falls into red zone 794, which illustrates when command 784 violates $t_{PP}$. In order to guarantee that command 784 falls in green zone 796, the memory controller adheres to constraint eight, which is "$t_{AWR} \geq t_{WRP} - t_{RDP} + t_{PP} + t_{CC} - 4$." If this constraint were ignored, the memory controller would need special hardware to ensure that $t_{PP}$ is not violated on a non-Early Read write-read turnaround.

In addition, as one skilled in the art can appreciate, the command tiling for the read stream may differ from what is shown in FIG. 7, based on system configuration and dynamic conditions. Likewise for the write stream. FIG. 7 is just one possibility, meant for illustrative purposes only.

Figure 8:
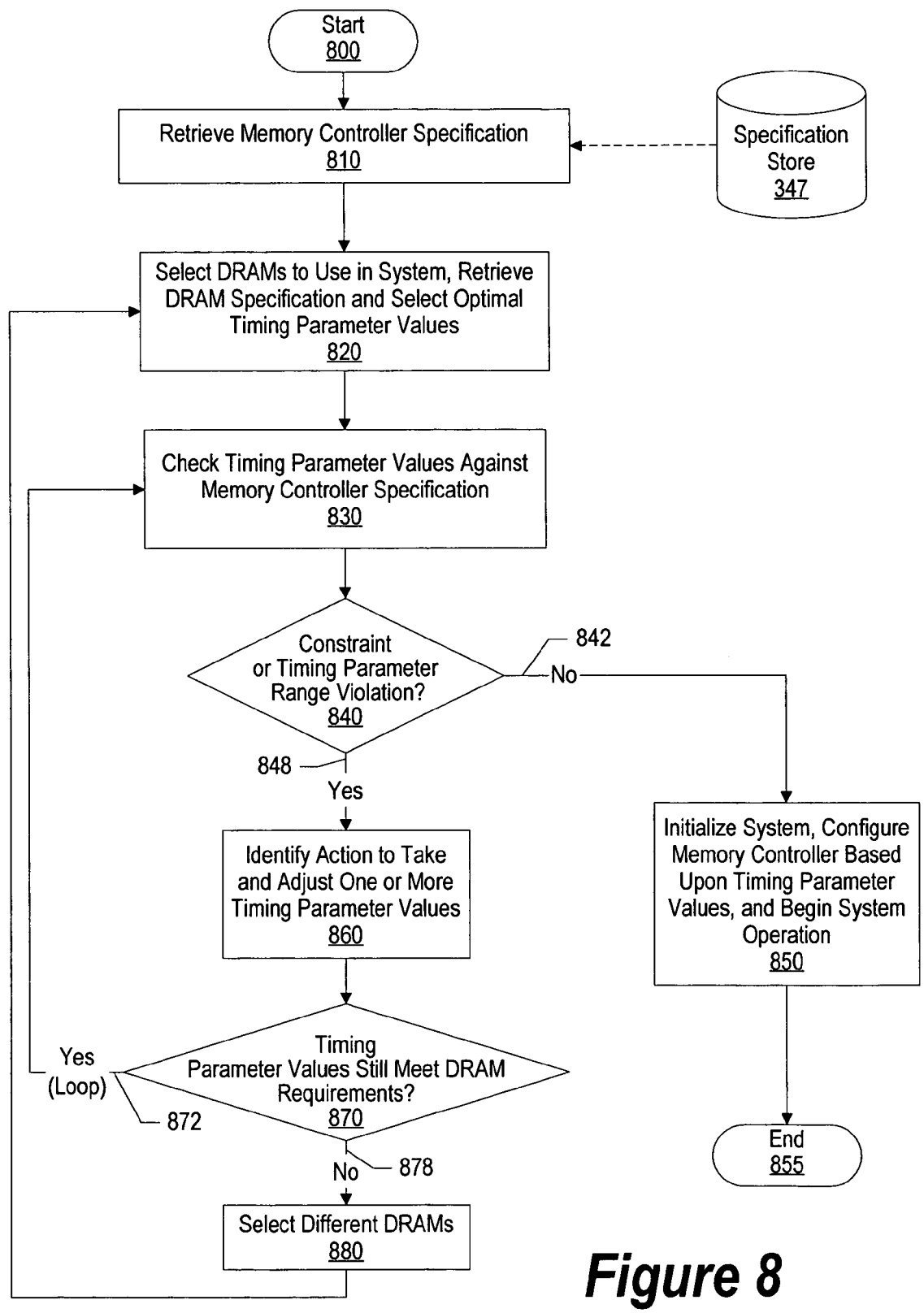
FIG. 8 is a flowchart showing steps taken in using constraints to configure a memory system.

FIG. 8 is a flowchart showing steps taken in using constraints to configure a memory system. A memory controller designer identifies, defines, and adheres to constraints to reduce/eliminate command collisions, data conflicts, and/or the need to check particular timing parameters. By doing so, the complexity of the memory controller design may be reduced (see FIG. 3 and corresponding text for further details regarding constraint generation).

Processing commences at 800, whereupon processing retrieves memory controller specifications from specification store 347 at step 810. Specification store 347 is the same as that shown in FIG. 3, and includes constraints and supported parameter ranges for a memory controller. At step 820, processing selects DRAMs to use in the memory system, retrieves the corresponding DRAM specification, and selects optimal timing parameter values based upon the DRAM specification. At step 830, processing checks the optimal timing parameter values against the memory controller specification.

A determination is made as to whether there is a constraint or timing parameter range violation (decision 840). If there are no constraint or timing parameter range violations, decision 840 branches to "No" branch 842 whereupon processing initializes the memory system, configures the memory controller (and perhaps DRAMs) based upon the timing parameter values, and begins system operation. Memory system configuration processing ends at 855.

On the other hand, if there is a constraint or timing parameter range violation, decision 840 branches to "Yes" branch 848 whereupon processing identifies an action to take, and adjusts one or more timing parameter values (step 860). Using constraint eight shown in FIG. 5 as an example, processing adjusts $t_{AWR}$ in order to meet the constraint, and then checks whether the other constraints are still met with the adjusted $t_{AWR}$ and that the new parameter values still fall within the supported memory controller ranges (see below).

A determination is made as to whether the timing parameter values still meet the DRAM requirements (decision 870). If the timing parameter values still meet the DRAM requirements, decision 870 branches to "Yes" branch 872 which loops back to check the adjusted timing parameter values against the memory controller specification. On the other hand, if the timing parameter values do not still meet the DRAM requirements, decision 870 branches to "No" branch 878 whereupon different DRAMs need to be selected (step 880), and processing proceeds through the sequence of steps to determine whether the new DRAMs will work with the memory controller.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   retrieving timing parameter ranges for a plurality of timing parameters, each of the timing parameter ranges corresponding to a memory system architecture;
   determining that, in order to comply with each of the timing parameter ranges for the plurality of timing parameters, a design of a memory controller exceeds one or more pre-determined design goals, the design goals selected from the group consisting of a silicon area size and a schedule milestone;
   in response to determining that the design of the memory controller exceeds one or more of the pre-determined design goals in order to comply with each of the timing parameter ranges for the plurality of timing parameters, identifying a troublesome parameter value combination that includes a plurality of parameter values, wherein each of the parameter values corresponds to one of the timing parameter ranges;
   determining an occurrence probability of the plurality of parameter values, which signifies the probability that the troublesome parameter combination will occur;
   based upon the occurrence probability, identifying a constraint that simplifies the design of the memory controller that, when simplified, results in the memory controller meeting each of the one or more pre-determined design goals;
   configuring the memory controller based upon the identified constraint that simplifies the design of the memory controller; and
   selecting an external memory based upon the identified constraint.

2. The method of claim 1 wherein the constraint corresponds to a constraint type, the constraint type selected from the group consisting of a command collision probability reduction, a parameter validation option, and a data conflict resolution.

3. The method of claim 1 further comprising:
   determining that a performance of the memory controller degrades based upon the constraint; and
   signaling to include logic into the memory controller in response to the determination.

4. The method of claim 1 wherein the memory controller is included in a processing element architecture.

* * * * *